Feb. 9, 1943. A. FORBERG 2,310,579
CUTTING TOOL
Filed May 8, 1939
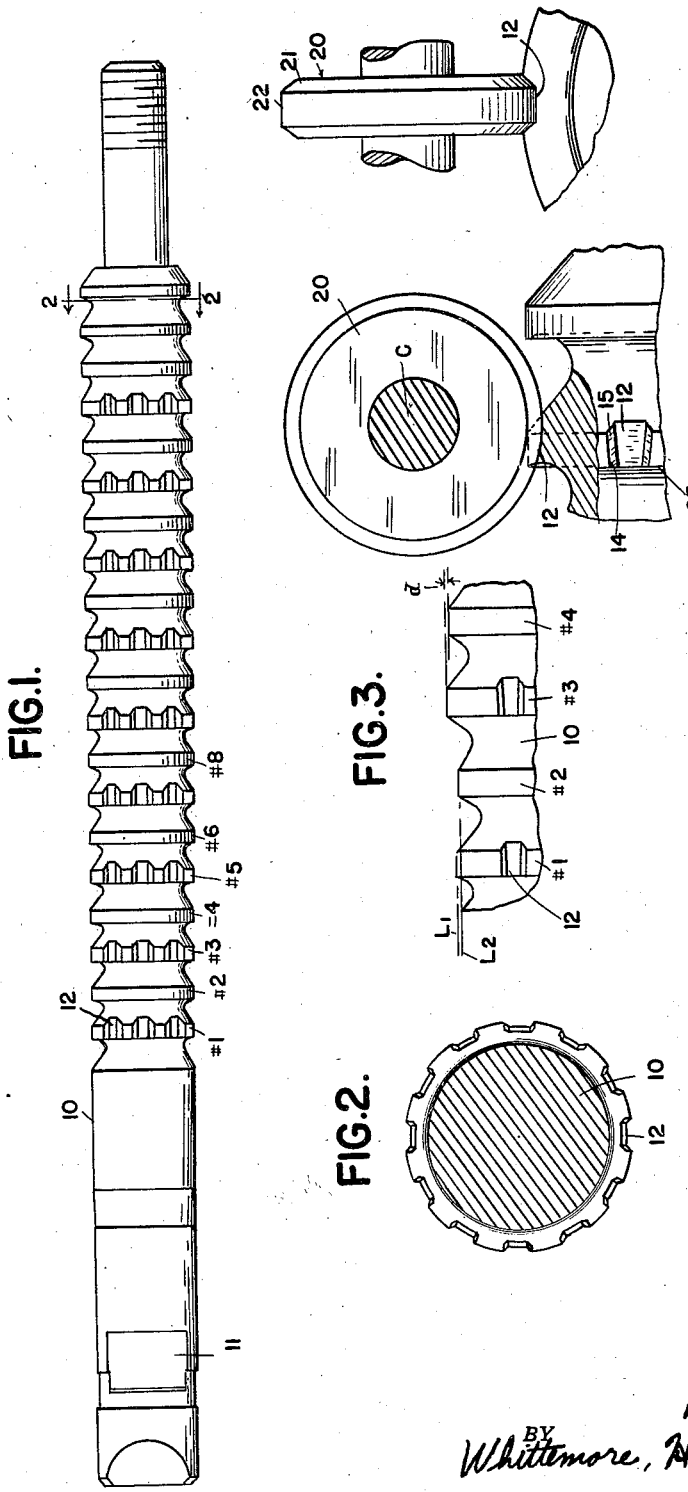
INVENTOR.
ALBERT FORBERG
BY Whittemore, Hulbert & Belknap
ATTORNEYS

UNITED STATES PATENT OFFICE 2,310,579

CUTTING TOOL

Albert Forberg, Detroit, Mich., assignor to National Broach & Machine Company, Detroit, Mich., a corporation of Michigan Application May 8, 1939, Serial No. 272,482

8 Claims. (Cl. 29—95.1)

The present invention relates to a cutting tool characterized by a novel arrangement of cutting edges.

In order to disclose the present invention in accordance with the patent statutes, I have chosen to illustrate and describe the invention as applied to a broach.

The invention is characterized broadly by the provision of a series of successively acting cutting edges, alternate cutting edges of which are discontinuous or notched, and each of which notched cutting edges is succeeded by a continuous cutting edge adapted to cut to a slightly less depth than the preceding notched cutting edge.

It is accordingly an object of the present invention to provide a cutting tool characterized by the provision of alternate notched cutting edges.

It is a further object of the present invention to provide a cutting tool characterized by the provision of a series of cutting edges, some of which are notched, and by the provision of a continuous cutting edge next following each notched cutting edge adapted to cut to a somewhat less depth.

It is a further object of the present invention to provide a broach having a plurality of notched teeth, each of which is immediately followed by a continuous tooth of slightly smaller size.

It is a further object of the present invention to provide notches in a tool of the character described having novel relief characteristics.

It is a further object of the present invention to provide a novel method for forming a cutting edge, interrupted by notches so formed as to provide side clearance.

Other objects of the invention will be apparent as the description proceeds, and when taken in conjunction with the accompanying drawing, wherein Figure 1 is a plan view of a broach embodying the present invention;

Figure 2 is a section on the line 2—2, Figure 1;

Figure 3 is an enlarged fragmentary view showing the relationship of cutting edges;

Figure 4 is a fragmentary elevation showing the method of forming notches; and

Figure 5 is a side elevation of parts shown in Figure 4.

To illustrate the present invention, I show at 10 a broach adapted to form a circular hole. The broach is provided with any suitable means for connecting it to mechanism for drawing it through the hole to be broached. I have illustrated at 11 in Figure 1 recesses for connection to such mechanism.

As illustrated in Figure 1, alternate teeth, such as those numbered 1, 3, 5, etc., are provided with a plurality of notches 12. The teeth intermediate the notched teeth, such as those indicated by the numerals 2, 4, 6, 8, etc., are continuous. The continuous teeth are of a diameter just slightly smaller than the external diameter of the preceding notched teeth. In order to illustrate a preferred relationship, I have tabulated below the external diameter of a series of teeth, numbered from 1 to 34. This broach is designed to cut a round hole, and as a result, the last few final teeth of the broach are all complete circular teeth.

| Tooth No. | Form | Diameter in inches |
|---|---|---|
| 1 | Nicked | 1.505 |
| 2 | Continuous | 1.503 |
| 3 | Nicked | 1.520 |
| 4 | Continuous | 1.518 |
| 5 | Nicked | 1.532 |
| 6 | Continuous | 1.530 |
| 7 | Nicked | 1.542 |
| 8 | Continuous | 1.540 |
| 9 | Nicked | 1.552 |
| 10 | Continuous | 1.550 |
| 11 | Nicked | 1.562 |
| 12 | Continuous | 1.560 |
| 13 | Nicked | 1.572 |
| 14 | Continuous | 1.570 |
| 15 | Nicked | 1.582 |
| 16 | Continuous | 1.580 |
| 17 | Nicked | 1.592 |
| 18 | Continuous | 1.590 |
| 19 | Nicked | 1.602 |
| 20 | Continuous | 1.600 |
| 21 | Nicked | 1.611 |
| 22 | Continuous | 1.609 |
| 23 | Nicked | 1.617 |
| 24 | Continuous | 1.615 |
| 25 | Nicked | 1.622 |
| 26 | Continuous | 1.620 |
| 27 | Continuous | 1.6215 |
| 28 | Continuous | 1.6235 |
| 29 | Continuous | 1.6250 |
| 30 | Continuous | 1.6256 |
| 31 | Continuous | 1.6260 |
| 32 | Continuous | 1.6260 |
| 33 | Continuous | 1.6260 |
| 34 | Continuous | 1.6260 |

It will be noted from the foregoing that each complete uninterrupted tooth is only slightly smaller in diameter than the preceding notched tooth. In the particular embodiment set forth in the table, this difference in diameter is .002 inch. At the same time it will be noted that the increase in diameter from one notched tooth to the next succeeding notched tooth is substantially larger, ranging from .015 inch between teeth 1 to 3 to .005 inch between teeth 23 and 25.

The result of this is that considering each pair of teeth, a notched tooth removes a considerable amount of metal in respect to depth, but this metal is removed in a series of grooves leaving upstanding ridges of metal therebetween. The succeeding continuous or uninterrupted tooth removes all but a small trace of these upstanding ridges.

I have found that by the present method, metal may be removed at a substantially higher rate than has heretofore been possible, and the cut per tooth averaged for each pair of teeth may be substantially greater. It has been found that a broach to perform a certain operation may by this means be shortened up in length from 25 to 50%, thereby effecting a substantial saving in the original cost.

The power required to broach, employing a broach of this construction, may be substantially smaller than the power necessary to use broaches as previously known. This may be explained for the reason that when using the present broach the groove cutting and the removal of the remaining ridge portions by continuous teeth constitutes easier cutting than that when cutting the entire circumference of the broach hole with each tooth. When each tooth cuts the entire circumference of the broached hole, power is necessary to cut the material and additional power is necessary for movement of the cut material through the hole as practically one piece.

The teeth of the broach may conveniently be regarded as comprising a series of sets of teeth, each set of teeth comprising a preceding notched tooth such as the teeth 1, 3, 5, etc., and a following continuous tooth such as the teeth 2, 4, 6, etc. Accordingly, the first set of teeth is made up of the teeth 1 and 2. The second set of teeth is made up of the teeth 3 and 4. The sets of teeth are of gradually increasing height from the entering toward the leaving end of the broach. Thus the teeth of the second set, namely teeth 3 and 4, are of greater height than the teeth of the first set, namely teeth 1 and 2, and the tooth 3 is higher than tooth 1 by substantially the same amount as the tooth 4 is higher than the tooth 2. Each set of teeth may then be considered a cutting entity in which the first, or notched, tooth is adapted to cut grooves of substantial depth, whereas the second, or continuous, tooth of the set is adapted to remove substantially but not quite all of the material of the work piece left between the grooves formed by the notched teeth. As a result of this, the portions of the continuous tooth of each set which are directly to the rear of the cutting portions of the preceding notched tooth, have clearance with respect to the bottoms of the grooves formed by the said notched teeth.

Referring now to Figure 3, the relationship of parts is illustrated. A nick tooth, such as #1, is shown as cutting to a depth indicated by the line $L_1$. Tooth #2, which is continuous, is of somewhat less height and cuts only to the line $L_2$. As will be noted in this figure, there is a slight clearance or spacing between the lines $L_1$ and $L_2$. Tooth #3 is substantially higher than either tooth #1 or tooth #2, and again being notched, is adapted to cut grooves of moderate depth around the periphery of the hole. Tooth #4, like tooth #2, is continuous and is of slightly smaller diameter than tooth #3, as indicated by the spacing shown at $d$.

I have found that the life of the broach and its performance is substantially improved by providing cutting clearance for the edges bordering the notches 12. This cutting clearance is well illustrated, although on an exaggerated scale, in Figure 5, in which the notch 12 has side cutting edges 14; the side surface back of which, as indicated at 15, is inclined to provide cutting clearance. In other words, the side edges 15 which define the edges of a notch are inclined away from each other towards the rear of the broach. It will be understood, of course, as usual the top of the broach teeth is provided with conventional cutting clearance, and the front face of the teeth is provided with the usual hook or rake.

In Figures 4 and 5 I have illustrated the method by which the notches are formed in the notched teeth in a manner to provide the cutting clearance previously referred to. A grinding wheel 20 is provided with surfaces 21 which taper inwardly as measured in an outwardly radial direction. The grinding wheel 20 is also provided, as illustrated in this figure, with a flat circular edge 22.

In order to grind the notches with the cutting clearance as previously referred to, the grinder 20 is located with its center C located substantially behind the cutting edge 23 of the broach tooth being notched. As a result of this, the notch tapers radially inwardly from front to back, and in like manner the side walls of the notch diverge rearwardly. As a result of this the cutting elements intermediate the notches 12 cut freely and cleanly with a minimum of power required, and with a corresponding long life of the tool.

While I have illustrated the present invention as applied to a circular broach, it will be readily apparent that the same may be used on broaches adapted to cut other shapes, and it is also applicable to other cutting tools, such for example as planers, and in a proper case, to rotary cutters.

While I have illustrated and described only one embodiment of my invention, it will be apparent to those skilled in the art that various additions, modifications, omissions, combinations and substitutions may be made which will be within the spirit and scope of my invention as defined by the appended claims.

What I claim as my invention is:

1. A broach having a series of progressively stepped peripherally notched teeth, each of said notched teeth being followed by a continuous tooth of slightly less effective height than its corresponding notched tooth.

2. A broach having a series of progressively stepped peripherally notched teeth, each of said notched teeth being followed by a continuous tooth of slightly less effective height than its corresponding notched tooth, and a following series of progressively stepped continuous teeth to finish a work piece to exact dimension.

3. A broach for forming a round hole comprising a series of cutting teeth, alternate teeth being generally circular but provided with peripheral notches and being of progressively increasing diameter, the remaining teeth being of uninterrupted circular shape.

4. A broach for forming a round hole comprising a series of cutting teeth, alternate teeth being generally circular but provided with peripheral notches and being of progressively increasing diameter, the remaining teeth being of uninterrupted circular shape, each uninterrupted circular tooth being of slightly less diameter than its preceding notched tooth.

5. A broach for forming a round hole comprising a series of cutting teeth, alternate teeth being generally circular but provided with peripheral notches and being of progressively increasing diameter, the remaining teeth being of uninterrupted circular shape, each uninterrupted circular tooth being of slightly less diameter than its preceding notched tooth, the difference in diameter between an uninterrupted circular tooth and its preceding notched tooth being substantially less than the difference in diameter between adjacent notched teeth.

6. A broach having a series of progressively stepped peripherally notched teeth, each of said notched teeth being followed by a continuous tooth of slightly less effective height than its corresponding notched tooth, the notches being of increasing width from front to back to provide cutting clearance.

7. In a broach for forming a hole, a series of sets of cutting teeth, each set having a preceding notched tooth adapted to cut relatively deep grooves in the work piece and each set having a following continuous tooth of slightly less height than the said preceding notched tooth, said following continuous tooth being adapted to remove nearly but not quite all of the material of the work piece left between said relatively deep grooves, each set of teeth being of progressively increasing height, and a final series of uninterrupted, continuous teeth of increasing height to machine the work piece to final dimensions.

8. A broach for forming a smooth, round hole comprising a series of cutting teeth, alternate teeth being progressively stepped and generally circular but provided with peripheral notches, the remaining teeth being of uninterrupted circular shape, each uninterrupted circular tooth being of slightly less diameter than its preceding notched tooth, whereby it removes substantially but not quite all of the material left by the notches of its preceding notched tooth.

ALBERT FORBERG.